(No Model.) 2 Sheets—Sheet 1.

S. ELLIOTT.
SHIELD OR COVERING FOR DRIVE CHAINS.

No. 491,750. Patented Feb. 14, 1893.

Witnesses:
Oscar F. Hill
Fred S. Greenleaf

Inventor,
Sterling Elliott.
By Crosby & Gregory Attys.

THE NORRIS PETERS CO., PHOTO-LITHO., WASHINGTON, D. C.

(No Model.) 2 Sheets—Sheet 2.
S. ELLIOTT.
SHIELD OR COVERING FOR DRIVE CHAINS.
No. 491,750. Patented Feb. 14, 1893.
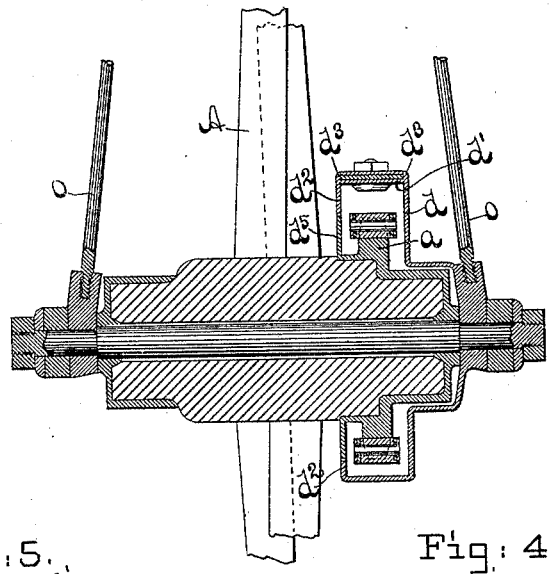
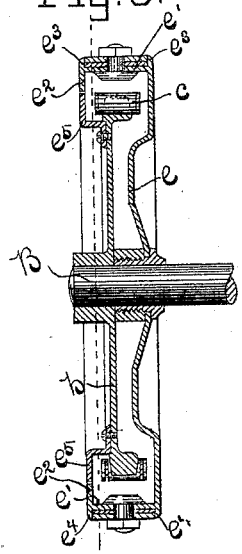
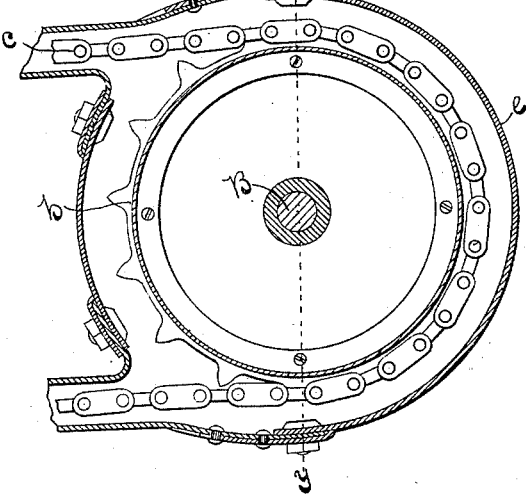
Witnesses:
Oscar F. Hill
Fred S. Greenleaf
Inventor.
Sterling Elliott.
by Crosby & Gregory Attys.

UNITED STATES PATENT OFFICE.

STERLING ELLIOTT, OF NEWTON, MASSACHUSETTS.

SHIELD OR COVERING FOR DRIVE-CHAINS.

SPECIFICATION forming part of Letters Patent No. 491,750, dated February 14, 1893.

Application filed June 25, 1891. Serial No. 397,502. (No model.)

Be it known that I, STERLING ELLIOTT, of Newton, county of Middlesex, State of Massachusetts, have invented an Improvement in Shields or Coverings for Drive-Chains, of which the following description, in connection with the accompanying drawings, is a specification, like letters and figures on the drawings representing like parts.

The principal objections urged to the use of drive chains for velocipedes, is that the oil soils the clothing, particularly if the machine is used by ladies, and the constant presence of dust and dirt has been the cause of extra friction and consequent wear of the chain and its wheels.

This invention comprehends the employment of a shield or covering for the sprocket or chain wheels, or a portion thereof, and also a shield or covering for the chain, or a portion thereof. The shield or covering for the chain wheels, is preferably composed of metallic or other shells of suitable shape; other shield or covering for the chain is preferably composed of leather or other flexible tubes.

Figure 1:
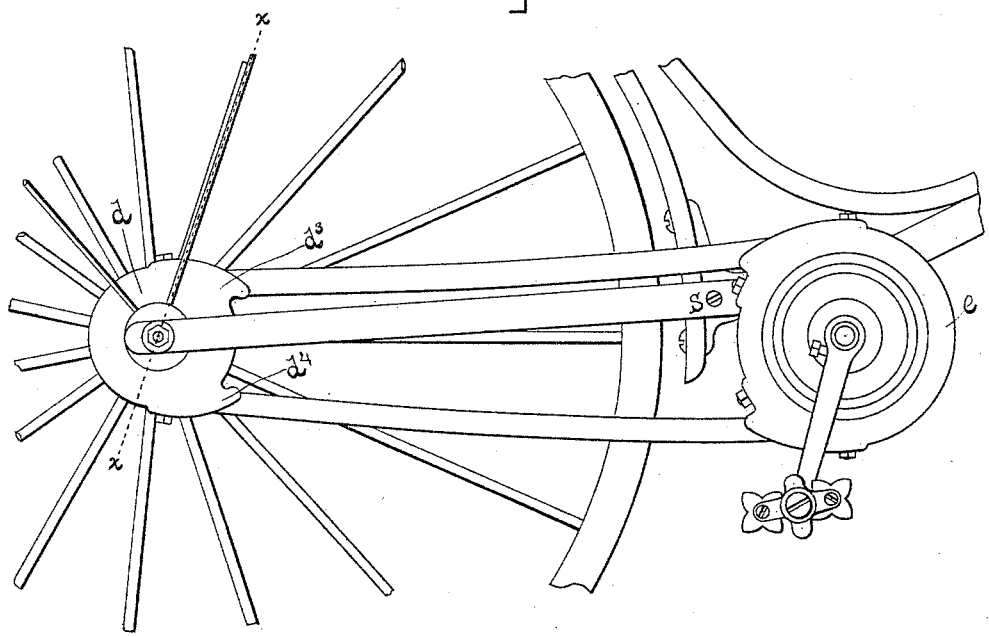
Figure 2:
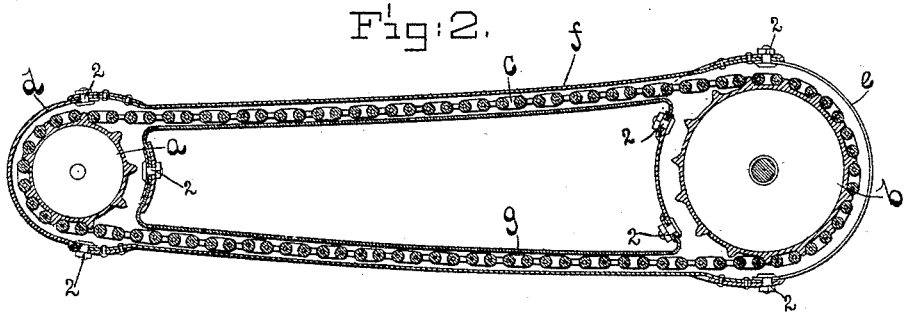

Figure 1, shows in side elevation a portion of a velocipede showing the shield or covering for the drive chain, and sprocket wheels. Fig. 2, is a vertical section of the sprocket wheel, the drive chain, and the shield or covering. Fig. 3, an enlarged section of the parts shown in Fig. 1, taken on the dotted line $x$—$x$. Fig. 4, an enlarged view of one of the sprocket wheels and its inclosing shell shown in Fig. 2, and Fig. 5, a vertical section of the parts shown in Fig. 4 taken on the dotted line $y$—$y$.

The sprocket or chain wheel $a$ is herein shown as secured to the hub of a wheel A, and the sprocket or chain wheel $b$ is herein shown as secured to a shaft B, and a sprocket or drive chain $c$ is provided for these sprocket wheels, all of which may be of any usual or suitable construction. A shell, guard, or inclosing case, see Figs. 1 and 3, is composed of a circular face $d$, and an annular rim as $d'$, and an annular flange as $d^2$ at the outer edge of said rim lying substantially parallel with the circular face. Lips $d^3, d^3$, are also formed on the shell, or guard, at the sides thereof. This shell is mounted upon the shaft of the wheel A and is held stationary by rods $o$. An annular plate or ring $d^5$ is mounted on the hub of the wheel A, which substantially fills the space formed by the flange $d^2$, lying substantially in the same plane, and this disk is adapted to rotate with the sprocket wheel. This shell with its rim and flange, together with the plate $d^5$ constitute an inclosing guard or shield for the sprocket wheel $a$. The sprocket wheel $b$ is made as an imperforate disk mounted on the shaft B, and has secured to it an annular rim $e^5$ slightly off-set, as shown in Fig. 5, and a shell is mounted on or secured to the bearing carrying the sprocket wheel shaft, it comprising a circular face $e$, a rim $e'$, a flange $e^2$ at the outer end of said rim, and projecting lips $e^3, e^3$, and $e^4, e^4$. This shell is stationary, and combined with the rim $e'$ and flange $e^2$, and the imperforate disk constituting the body of the sprocket wheel, and flange or ring $e^5$ a substantially dust tight chamber is formed in which the drive chain moves. The rim $e'$ of the shell $e$ has an opening through it in two places for the passage of the drive chain, and the rim $d'$ also has an opening through it in two places for the passage of the drive chain. Leather, rubber or other flexible tubes $f$, $g$, inclose the portions of the drive chain $c$ between the sprocket wheels $a$, $b$, said flexible tubes being substantially alike and attached at their ends to the shells $d$, $e$ by rivets 2, or otherwise.

I claim—

1. The shells $d$, $e$, for the sprocket wheels, combined with tubes $f$, $g$, substantially tangent to the periphery of said wheels connecting said shells and inclosing the drive chain between them, substantially as described.

2. The shells $d$, $e$, for the sprocket wheels, having openings or passages therethrough for the drive chain, combined with tubes inclosing the drive chain between the said shells, one or both of said tubes being flexible, substantially as described.

3. The metallic shells $d$, $e$, having projecting lips, and having openings or passages for the drive chain, combined with flexible tubes inclosing said drive chain, and connected to the shells, substantially as described.

4. Stationary guards or shells inclosing the sprocket wheels and having openings for the passage of driving chain, in combination with a flange secured to and revolving with the sprocket wheel in close proximity to the stationary guard, substantially as described.

5. The combination with sprocket wheels and a sprocket chain, of flexible inclosing tubes for the said chain, substantially as described.

6. A sprocket wheel formed of an imperforate disk of metal, having attached to it near its periphery a flange as $e^5$, offset therefrom, combined with the stationary inclosing shell as $e$, provided with a rim and a flange $e^2$ substantially in the plane of the flange $e^5$, substantially as described.

7. The combination with sprocket wheels and a sprocket chain, of flexible inclosing tubes for the said chain, substantially tangent to the periphery of said wheels, substantially as described.

In testimony whereof I have signed my name to this specification in the presence of two subscribing witnesses.

STERLING ELLIOTT.

Witnesses:
BERNICE J. NOYES,
EMMA J. BENNETT.